US011509712B2

(12) United States Patent
Aldamiz Echevarria et al.

(10) Patent No.: US 11,509,712 B2
(45) Date of Patent: *Nov. 22, 2022

(54) FASHION ITEM ANALYSIS BASED ON USER ENSEMBLES IN ONLINE FASHION COMMUNITY

(71) Applicant: BLOOMPAPERS SL, Barcelona (ES)

(72) Inventors: Gabriel Aldamiz Echevarria, Bilbao (ES); David Bolufer, Bilbao (ES); Marc Torrens, Bilbao (ES); Sergio Nieto, Bilbao (ES)

(73) Assignee: BLOOMPAPERS SL, Barcelona (ES)

( * ) Notice: Subject to any disclaimer, the term of this patent is extended or adjusted under 35 U.S.C. 154(b) by 187 days.

This patent is subject to a terminal disclaimer.

(21) Appl. No.: 16/942,525

(22) Filed: Jul. 29, 2020

(65) Prior Publication Data

US 2020/0358847 A1 Nov. 12, 2020

Related U.S. Application Data

(63) Continuation of application No. 15/280,270, filed on Sep. 29, 2016, now Pat. No. 10,771,544, which is a continuation of application No. 13/966,077, filed on Aug. 13, 2013, now Pat. No. 9,479,577.

(60) Provisional application No. 61/683,135, filed on Aug. 14, 2012.

(51) Int. Cl.
| | |
|---|---|
| *G06F 15/16* | (2006.01) |
| *H04L 67/104* | (2022.01) |
| *G06Q 30/02* | (2012.01) |
| *G06F 16/583* | (2019.01) |
| *G06Q 50/00* | (2012.01) |

(52) U.S. Cl.
CPC ......... *H04L 67/104* (2013.01); *G06F 16/583* (2019.01); *G06Q 30/02* (2013.01); *G06Q 50/01* (2013.01)

(58) Field of Classification Search
CPC .... G06Q 30/02; G06Q 30/0603; G06Q 20/12; G06Q 30/0641; G06Q 30/0643; G06Q 50/01; H04N 21/23109; H04N 21/25891; H04N 21/482; H04L 67/104; G06F 16/583
See application file for complete search history.

(56) References Cited

U.S. PATENT DOCUMENTS

| | | | | |
|---|---|---|---|---|
| 8,296,291 | B1 * | 10/2012 | Desjardins | ......... G06Q 30/0603 707/723 |
| 9,251,395 | B1 * | 2/2016 | Botchen | ................. G06Q 30/02 |
| 9,881,226 | B1 * | 1/2018 | Rybakov | ................... G06T 7/11 |
| 11,048,744 | B1 * | 6/2021 | Hohwald | ................ G06F 16/51 |

(Continued)

FOREIGN PATENT DOCUMENTS

WO WO-2011148270 A1 * 12/2011 ............. G06Q 10/10

*Primary Examiner* — Dustin Nguyen
*Assistant Examiner* — Hao H Nguyen
(74) *Attorney, Agent, or Firm* — Micah D. Stolowitz

(57) ABSTRACT

In an online fashion community system (100) users provide personal image content, such as digital user fashion images (104, 700) that include users themselves modeling multiple fashion items as an ensemble, as the basis of community interaction. Users also provide information about the multiple fashion items, including information linking (108) to a provider of each fashion item and fashion data (106) such as brand, color, style, etc. User interface system (116) allows users to search among, access, and interact about the user fashion ensembles.

15 Claims, 10 Drawing Sheets

(56) References Cited

U.S. PATENT DOCUMENTS

| | | | |
|---|---|---|---|
| 2008/0313055 A1* | 12/2008 | Stinson | G06Q 10/087 705/26.1 |
| 2010/0005105 A1* | 1/2010 | Zhang | G06F 16/90 707/E17.027 |
| 2010/0030578 A1* | 2/2010 | Siddique | H04W 4/00 705/26.1 |
| 2012/0197755 A1* | 8/2012 | Felder | G06Q 30/0643 705/26.8 |
| 2012/0197764 A1* | 8/2012 | Nuzzi | G06Q 30/0641 705/27.1 |
| 2013/0007124 A1* | 1/2013 | Sweeney | G06F 16/3334 709/204 |
| 2013/0083999 A1* | 4/2013 | Bhardwaj | G06T 7/41 382/165 |
| 2013/0085893 A1* | 4/2013 | Bhardwaj | G06F 16/24578 705/26.62 |
| 2013/0215116 A1* | 8/2013 | Siddique | G06Q 20/40 705/26.7 |
| 2013/0226711 A1* | 8/2013 | Wu | G06Q 30/02 705/14.69 |
| 2013/0304747 A1* | 11/2013 | Braham | G06F 16/26 707/748 |
| 2013/0343615 A1* | 12/2013 | Zhang | G06V 20/10 382/111 |
| 2014/0012905 A1* | 1/2014 | Roche | H04L 67/141 709/204 |
| 2014/0052584 A1* | 2/2014 | Gershon | G09G 5/06 705/26.63 |
| 2014/0089142 A1* | 3/2014 | Jackovin | G06Q 30/0623 705/26.61 |
| 2014/0177964 A1* | 6/2014 | Godlewski | H04N 21/2343 382/190 |
| 2014/0244388 A1* | 8/2014 | Manouchehri | H04L 51/52 705/14.53 |
| 2014/0279068 A1* | 9/2014 | Systrom | G06Q 30/0269 705/14.73 |
| 2015/0024840 A1* | 1/2015 | Poon | A63F 13/332 463/31 |
| 2015/0058079 A1* | 2/2015 | Freund | G06Q 30/0202 705/7.31 |
| 2015/0095184 A1* | 4/2015 | Ainsworth | G06Q 30/0631 705/26.7 |
| 2015/0170250 A1* | 6/2015 | Dalal | G06Q 30/0641 705/26.7 |
| 2016/0098784 A1* | 4/2016 | Ainsworth, III | G06Q 30/0631 705/26.7 |
| 2016/0203525 A1* | 7/2016 | Hara | G06N 20/00 705/14.67 |

* cited by examiner

FASHION ITEM ANALYSIS BASED ON USER ENSEMBLES IN ONLINE FASHION COMMUNITY

RELATED APPLICATIONS

This application is a continuation of U.S. patent application Ser. No. 15/280,270, filed Sep. 29, 2016, now U.S. Pat. No. 10,771,544 which is a continuation of and claims priority benefit to U.S. patent application Ser. No. 13/966,077, filed Aug. 13, 2013, now U.S. Pat. No. 9,479,577, which is a non-provisional application of U.S. Provisional Application No. 61/683,135, filed on Aug. 14, 2012, all of which are incorporated herein by this reference.

TECHNICAL FIELD

This invention relates to online communities and, in particular, to an online fashion community.

BACKGROUND AND SUMMARY OF THE INVENTION

Online social media encompasses a wide range of computer network-based sites through which people interact with each other. Two distinct types of online social media include social network sites and online communities. Social network sites are generally based upon direct interpersonal connections, and often interpersonal connections that exist outside of or antecedent to the online realm. For example, sites such as Facebook.com and LinkedIn.com provide communication frameworks that focus on direct personal or professional relationships. In contrast, online communities are generally based upon topics of common interest where community members come together to discuss, share, or learn information about the community topic.

Online communities cover an immense range of topics and have evolved from the earliest days of networked interaction. From online bulletin boards to discussion forums, online communities have been a popular and egalitarian forum for discussing and sharing information and opinions. In this discussion-focused context, online communities have been a predominantly text-based medium. However, one form of online community has evolved that focuses on community members or users sharing links to online sites or online photographs or images that are of interest, rather than being dominated by text-based discussion. This sort of community, sometimes called a content curation site, has been popularized by the general-topic site Pinterest.com. An analogous site directed to fashion-related content is Weheartit.com.

An advantage of online communities configured as content curation sites is that they capture the richness of network-based images for an online community. A disadvantage, however, is that they focus on image and information sources other than the community members. A community member shares a personal interest based upon, or represented by, an online image created by another person.

Accordingly, an online fashion community is provided in which community members provide personal image content as the basis of community interaction. In one implementation, community members provide digital fashion images that include themselves modeling multiple fashion items as an ensemble. Each user also provides information about the multiple fashion items, including information linking to a provider of each fashion item, such as a link to a network site operated by the provider. (The provider may be a manufacturer or a retailer, for example.) In addition, fashion data about the fashion items is obtained. For example, the community member may provide fashion data such as brand, color, style, etc. Alternatively, the community site may obtain the fashion data by a computer automatically accessing the provider network site. In this implementation the community member may be prompted to validate the accuracy of the fashion information retrieved from the provider network site.

Additional aspects and advantages of this online fashion community system and method will be apparent from the following detailed description that proceeds with reference to the accompanying drawings.

BRIEF DRAWINGS DESCRIPTION

DETAILED DESCRIPTION

Figure 1:
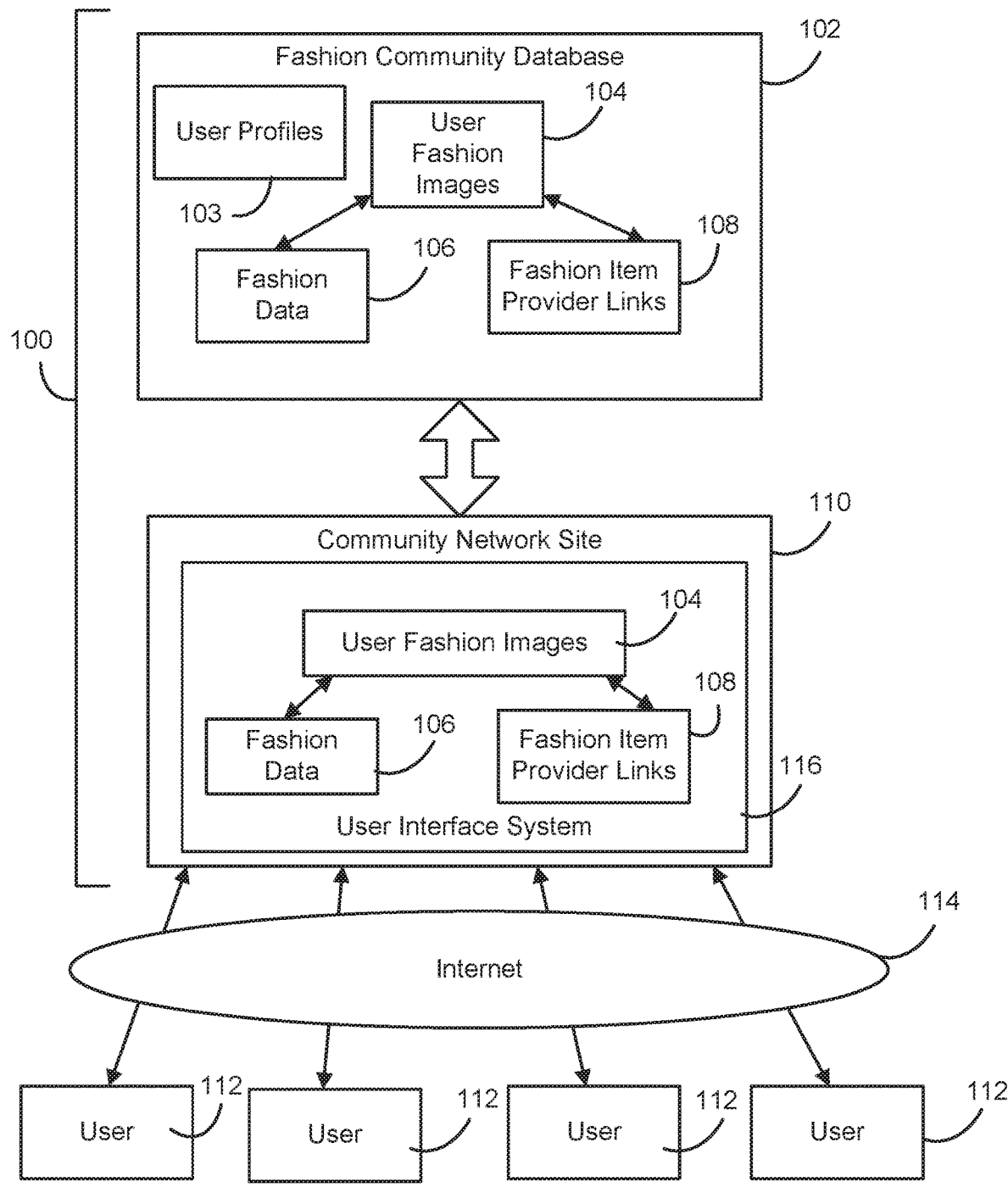
FIG. 1 is a block diagram of an online fashion community system.

FIG. 1 is a block diagram of an online fashion community system 100 in which community members or users (referred to generally as users) provide personal digital image content as the basis of interaction among community users. In one implementation, community users provide user fashion images in which the users themselves model multiple fashion items together as an ensemble. The user fashion images of community users are graphic representations of combinations of fashion items that the posting community users believe to be attractive, stylish, etc. and provide a basis for related community fashion interaction. It will be appreciated that the user fashion images may be still or motion images as represented by corresponding digital image files. For example, still images could be represented by image files in the JPEG file format, or other still image file formats, and motion images could be represented by image files in an MPEG file format, or other motion image file formats.

As one example, a user fashion image may include the user wearing a dress with various fashion accessories such as shoes, jewelry, and sunglasses, and also holding a handbag. The dress, shoes, jewelry, sunglasses, and handbag are fashion items that together comprise an ensemble that is assembled and modeled by the user. As another example, a user fashion image may include the user wearing slacks, a shirt, a coat, shoes, and a belt of an ensemble. Fashion community system 100 is applicable to both male and female users and male and female fashions. For purposes of illustration, the following description is directed primarily to female fashion and female users but is similarly applicable to male fashion and male users.

Fashion community system 100 includes a fashion community database 102 that stores user accounts or profiles 103, user fashion images 104 submitted or posted by community members or users, fashion information or data 106 relating to fashion items modeled by users in the images 104, and links 108 to providers, such as vendors or manufacturers of the fashion items. As examples, links 108 may correspond to a single-brand manufacturer or retailer, a multi-brand retailer, an aggregator website that aggregates fashion items of many other providers, etc. User profiles 103 may include a wide range of information about users including any or all of a user name, user location (e.g., country, city, and state), fashion images and related information uploaded by the user, links to other users or user fashion images liked by or commented on by the user, links to social network sites, etc.

Fashion community database 102 is in communication with a fashion community network site 110 such as a website available to multiple users 112 over a worldwide public computer network 114 (e.g., the Internet). Network site includes a user interface system 116 through which community user information and fashion information is passed between database 102 and users 112. Fashion community network site 110 uses interface system 116 to display fashion community information, such as user fashion images 104 and related fashion information 106 and provider links 108, as subjects of community interest and expression.

Figure 2:
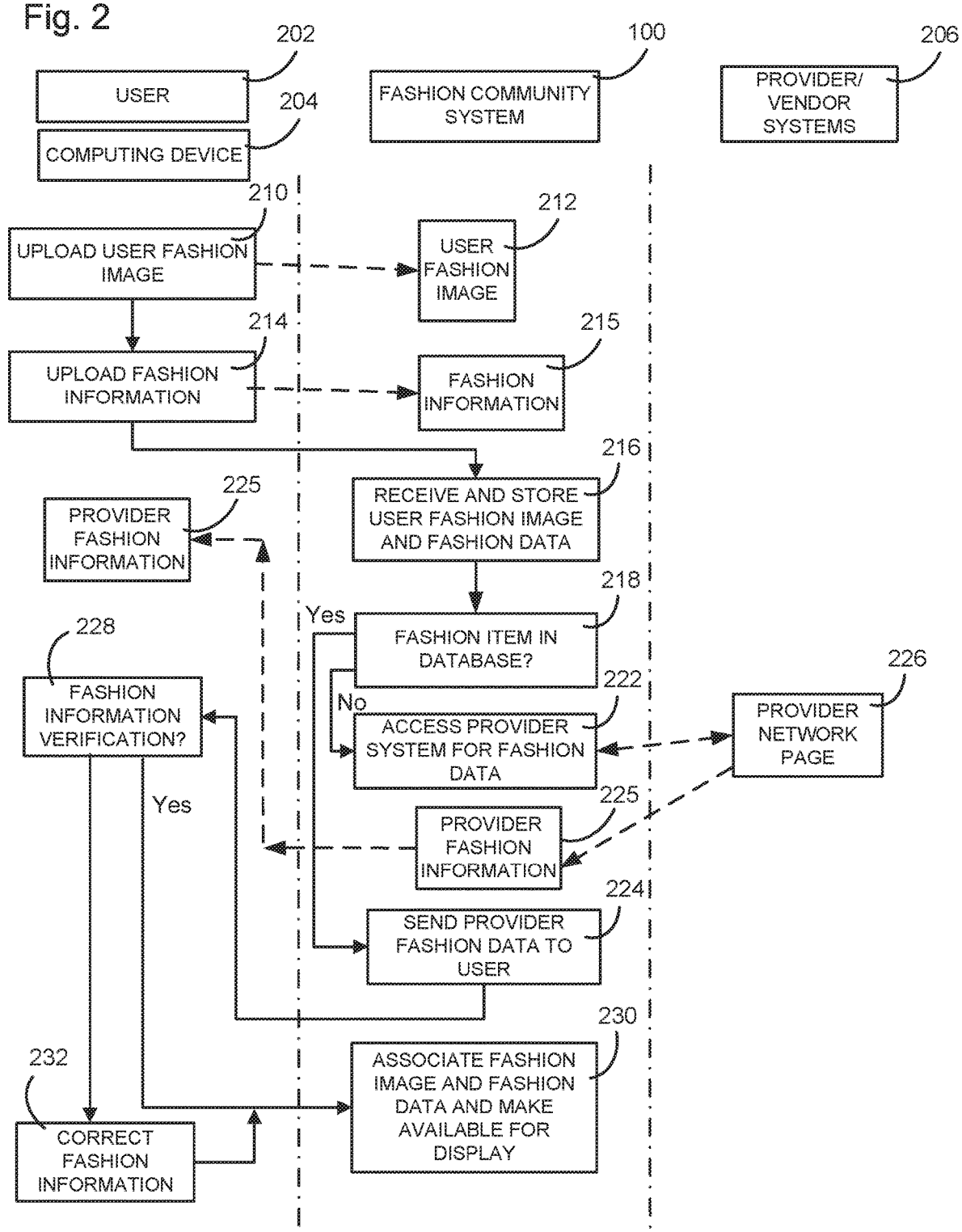
FIG. 2 is a combined flow and block diagram of a fashion community upload method.

FIG. 2 is a combined flow and block diagram of a fashion community upload method 200 in which a user fashion image 104 is received from a community user and incorporated into fashion community system 100. Community upload method 200 is described with reference to actions or operations that are performed or controlled by a user 202 operating a personal computing device 204 (e.g., desktop computer, laptop computer, tablet computer, "smart" telephone, etc.), fashion community system 100 operating on one or more server computers, and fashion provider systems 206 each operating on one or more server computers, typically under the control or management of the respective fashion providers.

Process block 210 indicates that user 202 provides a personal user fashion image 212 (i.e., a digital image file) to fashion community system 100 for storage in database 102. For example, user 202 uploads personal user fashion image 212 in digital form to fashion community system 100 via user interface system 116 (FIG. 1) of fashion community network site 110 (FIG. 1) on computing device 204. Personal user fashion image 212 includes user 202 wearing or otherwise modeling multiple fashion items as an ensemble. Fashion community system 100 may include user verification in the uploading of personal user fashion image 212 to confirm that photo 212 is of user 202 and conforms to community guidelines, including prohibitions against images not of users or that include nudity or minors, for example.

Process block 214 indicates that user 202 provides user-provided fashion information 215 to community system 100 for storage in database 102. Fashion information 215 may include a link to a provider of each of the fashion items in the ensemble, wherein the provider may be a manufacturer of the fashion item or a retailer who sells it. Fashion information 215 may also include any or all of a title for the ensemble of user fashion image 212, a description of the ensemble, the date, the user, information about the fashion items in the ensemble, including fashion item types, brands, colors, fabric prints, and additional user fashion images of the ensemble.

In one implementation, the link is to a page specifically related to the fashion item and may be referred to as an item-specific provider link. In addition to the provider link or as an alternative to it, the fashion information 215 provided by user 202 may include image tags or labels that specifically indicate or mark specific fashion items in image 212. The image tags may also correlate each fashion item with its corresponding provider link, and may also include additional fashion information (sometimes referred to as metadata) regarding the fashion item including any of the type of clothing or accessory, the color, the brand, the type of fabric in the fashion item, print or image patterns on the fabric, etc.

As an example, the type of clothing or accessory may be organized according to category and may include any or all of the following categories and types, others:

Category—TOP: Types—Dresses, Jumpsuits, Tunics, Shirt/Blouses, T Shirts, Tanks, Swimwear, Corsets, Cardigans, Sweaters, Turtlenecks, Vests, Blazers, Jackets, Capes, Coats, Trenches Category—BOTTOM: Types—Pants, Jeans, Harem/Baggy Pants, Leggings, Skirts, Shorts, Tutus Category—FOOTWEAR: Types—Ankle Boots/Booties, Boots, Flats, Gladiators, Heels/Wedges, Over The Knee, Oxfords/Derbies, Sneakers Category—ACCESSORIES: Types—Bags, Clutches, Beanies/Berets, Hats, Headdress, Belts, Necklaces, Bracelets, Scarves/Echarpes, Ties/Bows, Socks/Tights, Glasses/Sunglasses, Gloves, Backpacks, Color Tights, Earrings, Brooches, Watches Process block 216 indicates that fashion community system 100 receives and stores the user fashion image 212 with the fashion information provided by user 202. For example, fashion community system 100 stores the user fashion image 212 and the fashion information in community fashion database 102 as an ensemble or "look" associated with user 202.

Process block 218 indicates that fashion community system 100 determines whether each fashion item included in user fashion image 212 has been previously included in database 102. For example, fashion community system 100 compares an item-specific provider link provided by user 202 to item-specific provider links previously stored in database 102, which previously-stored links may be associated with one or more other ensembles or looks already stored in database 102. A previously-stored item-specific provider link in database 102 will have associated with it provider fashion data previously retrieved from the provider link, as described below in greater detail. For each item-specific provider link not previously stored in database 102, process block 218 proceeds to bock 222. For each item-specific provider link previously stored in database 102, process block 218 proceeds to process block 224.

Process block 222 indicates that fashion community system 100 accesses under computer control the item-specific provider link for each fashion item to obtain fashion data 225 from the corresponding fashion provider system 206. Typically, the item-specific provider link will access a network page 226 corresponding to the fashion item. Network page 226 may be, for example, an online retail catalog page corresponding to the fashion item and including detailed information about the item including item name, reference or catalog number, description, price, colors, one or more display images. The computer-controlled accessing of network page 226 may be executed by a software application, sometimes called a network robot or "bot" or a Web crawler, that automatically accesses and parses network page 226 to search for predefined information, which in one implementation may include any or all of item name, reference or catalog number, description, price, color, main display image and any additional display image, and returns the information 225 to system 100 for storage in database 102 as provider fashion data for the fashion item.

Process block 224 indicates that for each fashion item in the ensemble, provider fashion data 225 is sent to user 202 at computing device 204.

Process block 228 indicates that user is requested to provide confirmation or validation that fashion data 225 correctly characterizes the fashion item. If fashion data 220 is confirmed or validated by user 202, process block 228 proceeds to process block 230. Otherwise, process block 224 proceeds to process block 232.

Process block 230 indicates that user fashion image 212 and user-provided fashion information 215 are associated with provider fashion data 220 and make available to display for community users the fashion ensemble assembled and modeled by user 202.

Process block 232 indicates that any incorrect or invalid aspect of fashion data 220 is corrected with respect to the fashion item in the ensemble of fashion image 104. Correction may be made by user 202 directly (as illustrated) or by an operator of or moderator for community system 100 based upon correction information provided by user 202. Corrected fashion information is returned to fashion system 100 and process block 232 proceeds to process block 230.

Figure 3:
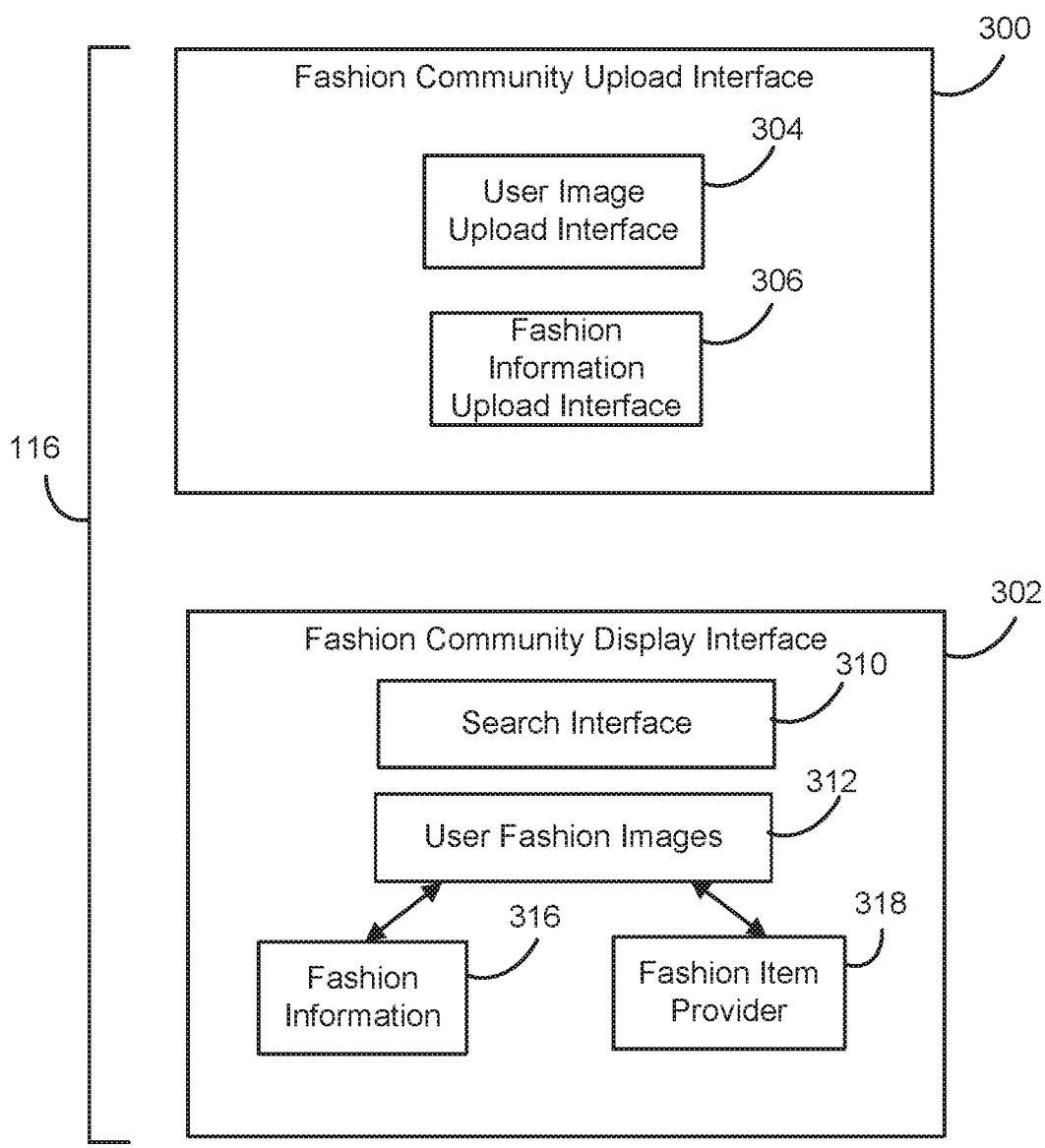
FIG. 3 is a functional block diagram of user interface system.

FIG. 3 is a functional block diagram of user interface system 116, which includes a fashion community upload user interface 300 and a fashion community display interface 302. Upload user interface 300 may be activated by a user to upload user fashion image 104 to fashion community system 100. Upload user interface 300 includes a user fashion image upload interface 304 with which the user indicates a personal fashion image file on the user's computing device to be uploaded to fashion community system 100. Alternatively, the user fashion image may be accessed from a network site indicated by the user, such as a blog or social network page of the user, by a link to a specific image or by a browser programming element (sometimes called a "bookmarklet") provided by fashion community system 100 to access and retrieve the image or images located at the site and provide it or them to the user to be selected for upload. Upon uploading of the personal fashion image file, a fashion information upload interface 306 is generated through which the user uploads fashion information relating to fashion items in the image.

Figure 4:
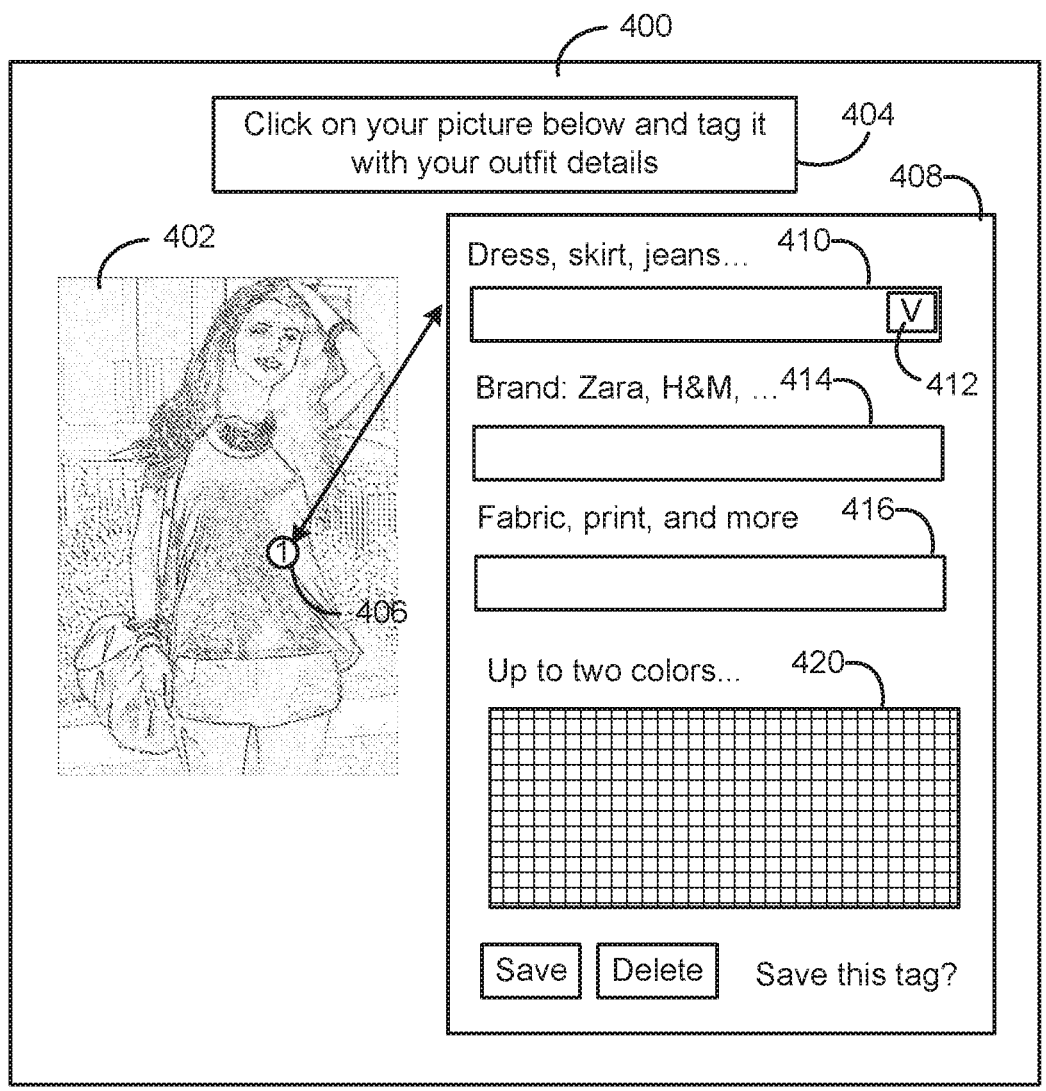
FIG. 4 is a diagrammatic illustration of a fashion information upload interface.

FIG. 4 is a diagrammatic illustration of a fashion information upload interface 400 as one implementation of fashion information upload interface 306. Fashion information upload interface 400 includes an image 402 of the uploaded personal fashion image file. An instruction 404 directs the user to "click on your picture below and tag it with your outfit details." Upload interface receives from the user a "click" or other computing device input at a location in image 402 on or adjacent a fashion item to indicate that fashion item. In response, upload interface 400 applies a tag marker 406 to the location indicated by the user. In the illustration of FIG. 4, for example, tag marker 406 is located on a shirt or blouse to refer to the shirt or blouse. Tag marker 406 as illustrated in FIG. 4 has an outline to highlight marker 406 relative to image 402 and also a numeric indicator for distinguishing multiple markers. It will be appreciated that tag marker 406 may be of any configuration and may also include alphanumeric indicators (e.g., fashion item types or brands) or no alphanumeric indicator.

In addition to applying tag marker 406, upload interface generates on the user's computing device a fashion information upload window 408 through which the user is prompted to upload selected fashion information relating to the indicated fashion item. For example, fashion information upload window 408 includes a fashion item type input 410 in which the user is prompted to enter a type for the fashion item, such as by providing a brief sample listing of types (e.g., "Dress, skirt, jeans . . . "). In the illustrated implementation, a drop-down menu control 412 is included to display or activate a predefined listing of fashion types upon user activation.

A fashion brand input 414 prompts the user to enter a manufacturer or retailer brand for the fashion item such as by providing a brief sample listing of fashion brands (e.g., "Brand: Zara, H&M, . . . "). Fashion brand input 414 may also provide a drop-down menu from which to select a fashion brand and/or may allow the user to type-in the fashion brand. A fabric detail input 416 prompts the user to enter any additional details regarding fabric of the fashion item, including fabric type (e.g., cotton, linen, silk, rayon, etc.) fabric prints (e.g., striped, polka dots, leopard, etc.), or any other tags a user opts to include. A fashion color input 420, which may include a spectrum of color choices (each corresponding to a block in put 420), prompts the user to input one or more colors characterizing the fashion item.

Figure 5:
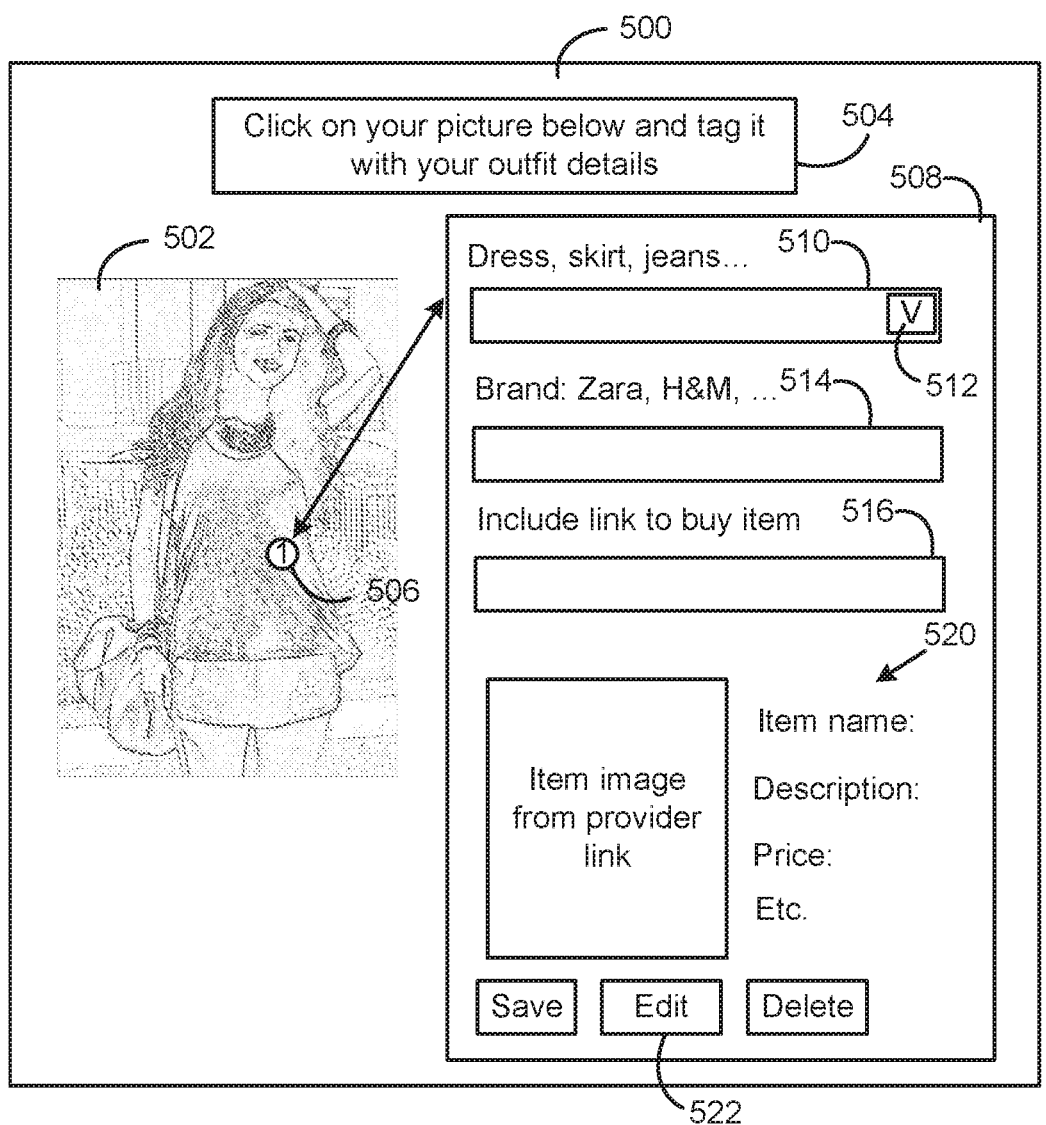
FIG. 5 is a diagrammatic illustration of a fashion information upload interface.

FIG. 5 is a diagrammatic illustration of a fashion information upload interface 500 as one implementation of fashion information upload interface 306. Fashion information upload interface 500 includes an image 502 of the uploaded personal fashion image file. An instruction 504 directs the user to "click on your picture below and tag it with your outfit details." Upload interface receives from the user a "click" or other computing device input at a location in image 502 on or adjacent a fashion item to indicate that fashion item. In response, upload interface 500 applies a tag marker 506 to the location indicated by the user. In the illustration of FIG. 5, for example, tag marker 506 is located on a shirt or blouse to refer to the shirt or blouse. Tag marker 506 as illustrated in FIG. 5 has an outline to highlight marker 506 relative to image 502 and also a numeric indicator for distinguishing multiple markers. It will be appreciated that tag marker 506 may be of any configuration and may also include alphanumeric indicators (e.g., fashion item types or brands) or no alphanumeric indicator.

In addition to applying tag marker 506, upload interface generates on the user's computing device a fashion information upload window 508 through which the user is prompted to upload selected fashion information relating to the indicated fashion item. For example, fashion information upload window 508 includes a fashion item type input 510 in which the user is prompted to enter a type for the fashion item, such as by providing a brief sample listing of types (e.g., "Dress, skirt, jeans . . . "). In the illustrated implementation, a drop-down menu control 512 is included to display or activate a predefined listing of fashion types upon user activation.

A fashion brand input 514 prompts the user to enter a manufacturer or retailer brand for the fashion item such as by providing a brief sample listing of fashion brands (e.g., "Zara, H&M, . . . "). Fashion brand input 514 may also provide a drop-down menu from which to select a fashion brand and/or may allow the user to type-in the fashion brand. A provider link input 516 prompts the user to input a link to a provider network page (e.g., on a provider website) relating to the fashion item. For example, the link may be to a provider or vendor catalog page for the fashion item. Based upon provider fashion associated with the link, retrieved from database 102 or from the provider network site, a fashion information affirmation section 520 displays the retrieved fashion information for affirmation by the user. An edit control 522 allows the user to access and modify the fashion information displayed in section 520.

With reference to FIG. 3, fashion community display interface 302 includes a fashion community search interface 310 with which a community user may search or browse the user fashion ensembles or looks of fashion community system 100. Search interface 310 may allow community user to search or browse among the user fashion ensembles according to any or multiple ones of the information fields used by community system 100, including fields relating to types, colors, or brands of fashion items, users who have posted ensembles, the locations of posting users, ensembles that have been affirmed or "liked" by the user, dates ensembles were posted, etc. Search interface may be rendered alone or together with other portions of display interface 302.

In one implementation, search interface 310 may include a listing of multiple fashion fields from which the user may select one or more search criteria. In another implementation, search interface may include a text entry block into which the user may enter one or more fashion fields as the search criteria. For example, the text entry block may include a user prompt such as "What do you want to wear?" Display interface 302 also includes one or more user ensemble images 312 that are displayed as a result of user-selected search criteria or based upon predefined default criteria in the absence of user-selected criteria. Fashion information 316 for fashion items included the user ensemble images and corresponding fashion provider information 318 are included with the ensemble images or accessed from links or tags in the ensemble images.

Figure 6:
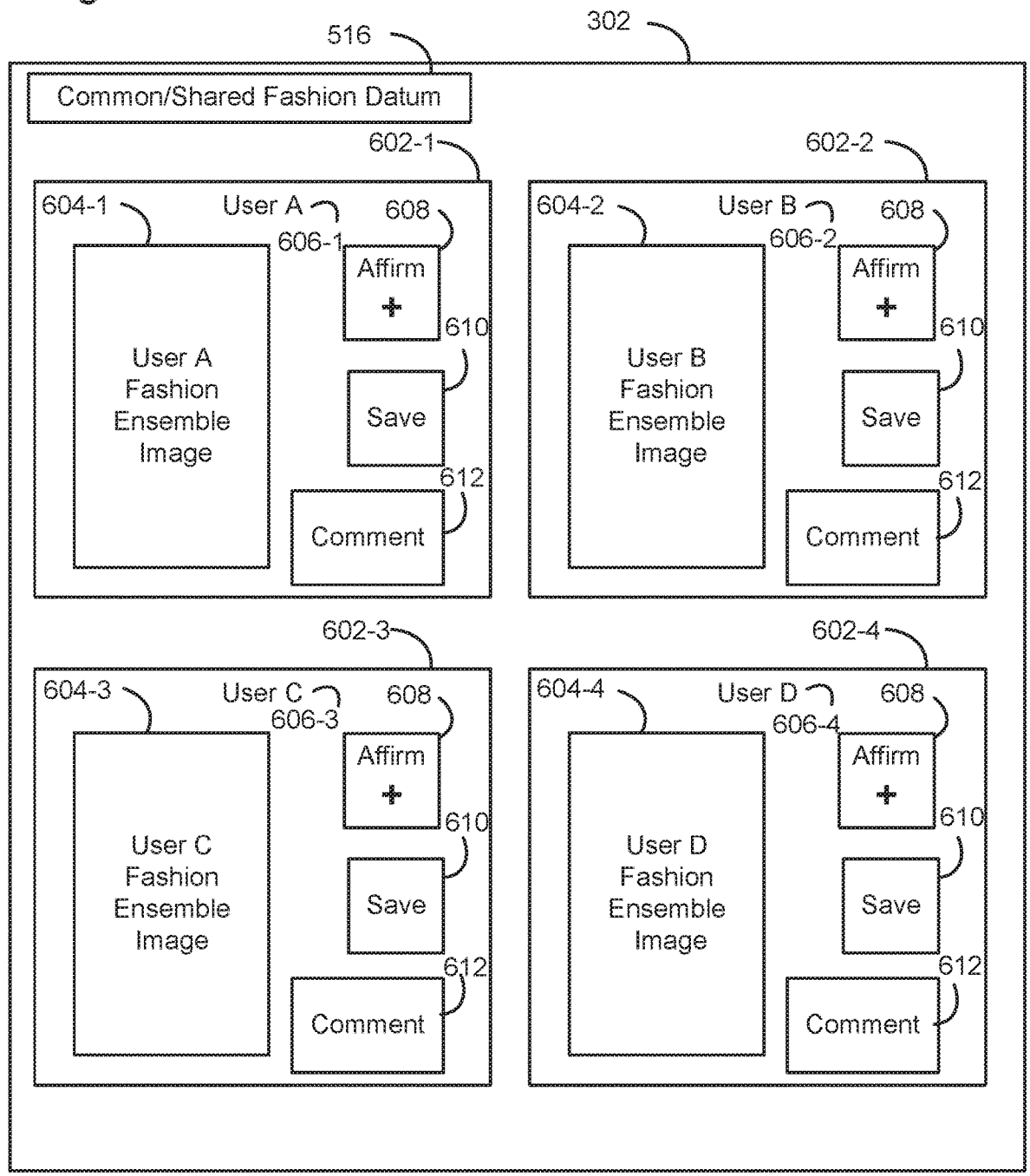
FIG. 6 is a diagrammatic illustration of one implementation of fashion community display interface.

FIG. 6 is a diagrammatic illustration of one implementation of fashion community display interface 302, as rendered on a display screen of a user computing device 204 (FIG. 2). Display interface includes multiple user fashion ensemble panels 602 (four shown, designated 602-1 through 602-4), with which are rendered a user ensemble image 604 (designated 604-1 through 604-4) and a username or identifier 606 (designated 606-1 through 606-4), respectively. Each of ensemble panels 602 may also include any or all of multiple graphical user interaction controls such as an ensemble affirmation or "like" control 608, an ensemble save control 610, and a user comment control 612.

Figure 7:
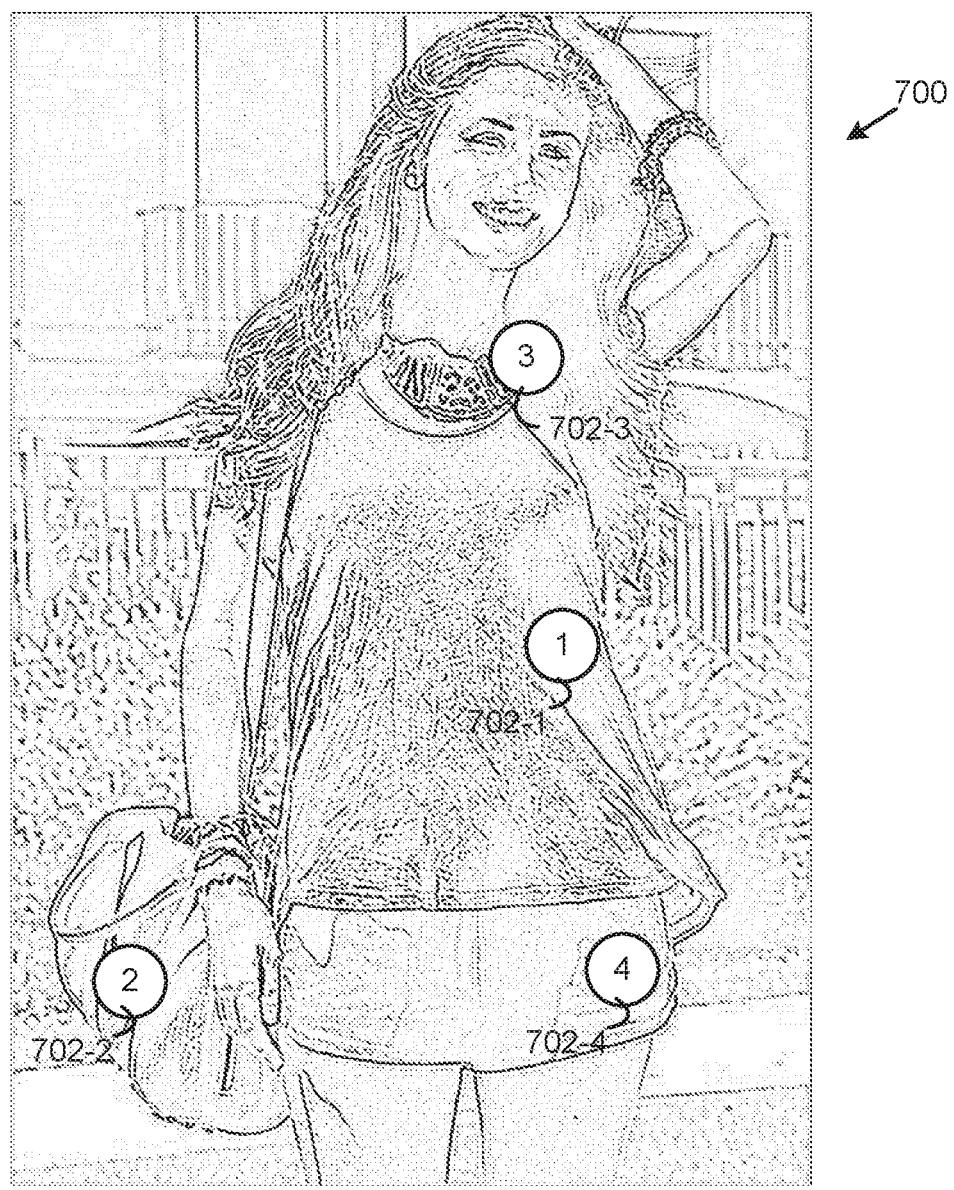
FIG. 7 is a diagrammatic illustration of a sample user ensemble image.

FIG. 7 is a diagrammatic illustration of a sample user ensemble image 700, which includes tags or links 702 (designated 702-1 through 702-4) for fashion items included in image 700. In the example of user ensemble image 700, tag 702-1 indicates a blouse or shirt, tag 702-2 indicates a handbag, tag 702-3 indicates a necklace, and tag 702-4 indicates a skirt. Tags 702 may be displayed concurrently with user ensemble images 604 of display interface 302 or may be displayed when a particular panel 602 or image 604 is selected by a viewing user to obtain additional fashion information. It will be appreciated that each of tags 702 includes an active link, activation of which provides the fashion information stored in database 102 with image 604.

Referring to FIG. 6, ensemble affirmation control 606 allows a viewing user to indicate that he or she likes or otherwise thinks highly of the user ensemble in the user ensemble image 604. Ensemble save control 608 allows the viewing user to save a link to the fashion ensemble panel 602. User comment control 610 allows the user to enter a comment relating to the ensemble of the fashion ensemble panel 602. Community system 100 stores viewing user affirmations and comments in association with the fashion ensemble panel 602, so the affirmations and comments are available for other viewing users to see. Community system 100 stores viewing user saves in association with the viewing user's community profile or account 103 so that the corresponding fashion ensemble panel 602 is more readily accessible by the viewing user. In one implementation, each community user may have saved fashion ensemble panels 602 organized in one or more albums or categories, defined by the user, to make user access to the fashion ensemble panels 602 more convenient.

Figure 8:
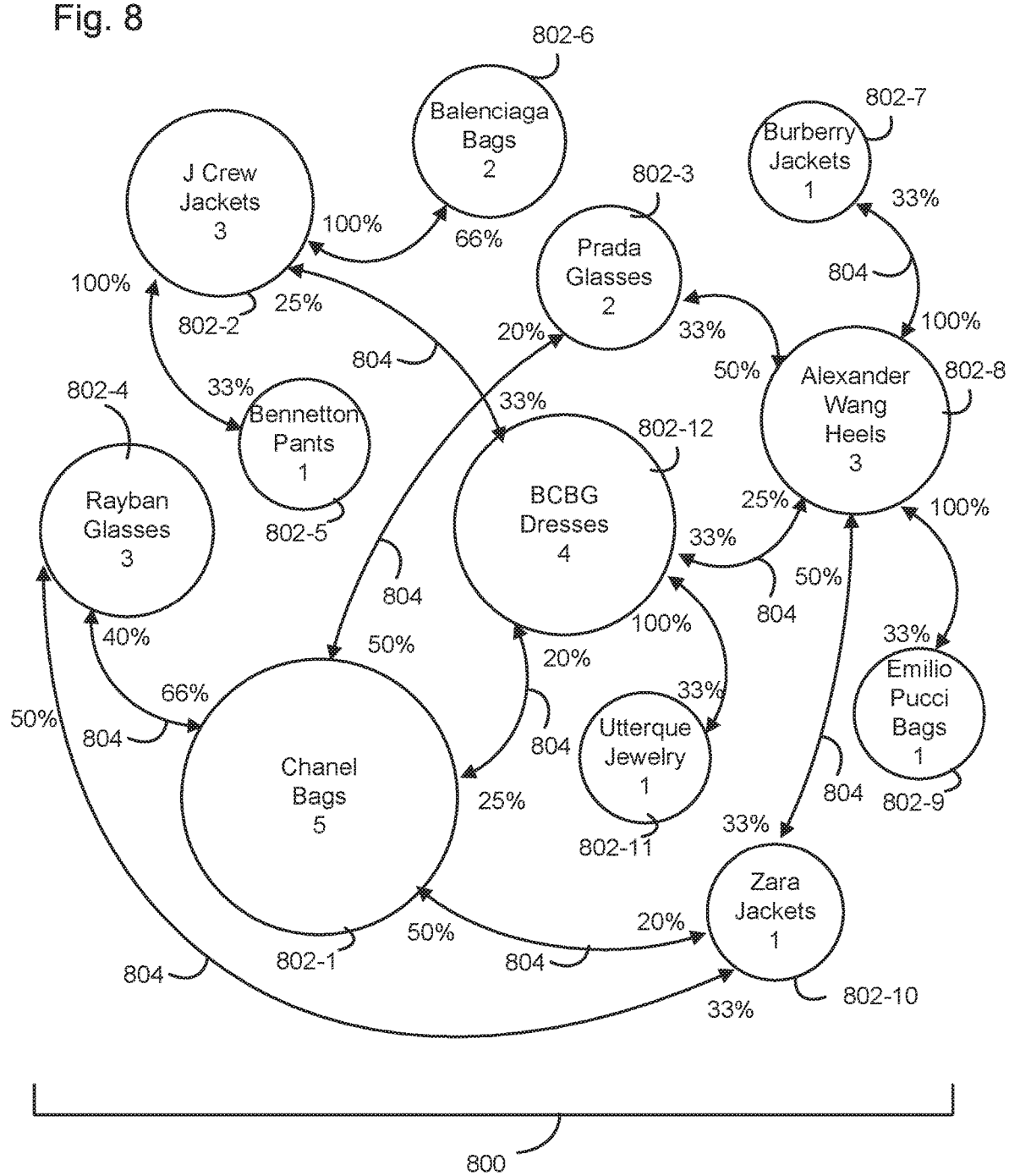
FIG. 8 is a diagrammatic illustration of a sample social fashion graph.

FIG. 8 is a diagrammatic illustration of a sample social fashion graph 800 that displays an extent of correlation between different fashion items being used together in user fashion ensembles included in fashion community system 100. In the example illustrated in FIG. 8, social fashion graph 800 includes multiple nodes 802 (designated 802-1 through 802-12) that correspond to fashion items included in a selected set of ensembles or looks. Social fashion graph 800 displays for each node 802 a bi-directional branch 804 (representative ones indicted by reference numeral 804) with each of one or more other nodes 802 indicating the degrees to which the corresponding fashion items are worn or used together in the selected set of ensembles, as described below in greater detail.

Nodes 802 in sample social fashion graph 800 each indicate a fashion item by type and brand, including for example node 802-1 indicating bags from the brand Chanel, node 802-2 indicating jackets from the brand J. Crew, node 802-3 indicating sunglasses from the brand Prada, etc. Nodes 802 may be rendered, as illustrated, with a size corresponding to the number of occurrences of the corresponding fashion item among the selected ensembles and may also or alternatively include a count indicator indicating specifically the number of occurrences of the fashion item among the selected ensembles.

Figure 9:
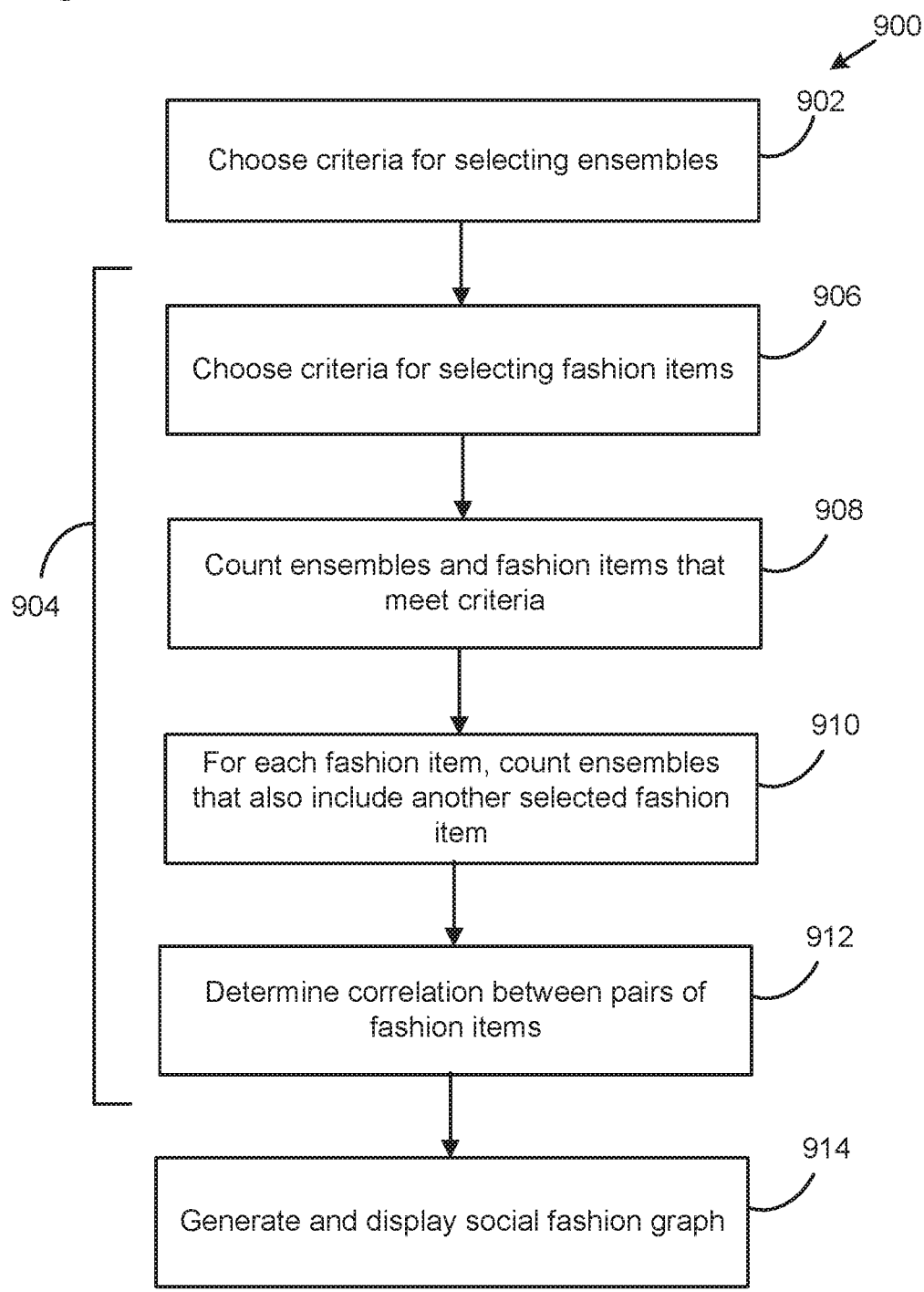
FIG. 9 is a flow diagram of a social fashion graph generating method.

FIG. 9 is a flow diagram of a social fashion graph generating method 900 for generating a social fashion graph 800 indicating correlations between fashion items in the selected set of user fashion ensembles or looks.

Process block 902 indicates that a user defines criteria to obtain multiple selected user fashion ensembles from among the user fashion ensembles included in fashion community system 90. For example, a community user may select a set of ensembles based upon any of the information fields used by community system 90, including fields relating to types, colors, or brands of fashion items, users who have posted ensembles, the locations of posting users, ensembles that have been affirmed, "liked," or saved by the user, dates ensembles were posted, etc.

Correlation process 904 indicates a method of generating correlations between fashion items that appear among the selected ensembles are determined. Each correlation may be determined with respect to a pair of fashion items included in ones of the selected ensembles. For example, bi-directional branch 804 between node 802-1 indicating bags from the brand Chanel and node 802-3 indicating sunglasses from the brand Prada may be determined as the respective percentages of ensembles among the selected ensembles that include both fashion items.

Process block 906 indicates that fashion item criteria are selected from among all of the fashion items included among the selected ensembles. The fashion item criteria may be selected from among one or more default criteria stored by community system 90 or may be specified by a user. The fashion criteria may encompass all fashion items included in the selected ensembles or may be limited to any specified fashion fields relating to the fashion items. For example, the fashion criteria may specify or determine correlations between brands of fashion items, or particular types of fashion items of specified brands, as illustrated in FIG. 8. Such a fashion criteria specification may indicate, for example, fashion items the user owns or has an interest in. The fashion item criteria define the fashion items for which nodes 802 of social fashion graph 800 may be rendered.

Process block 908 indicates that fashion items and ensembles that meet the fashion criteria are identified and counted.

Process block 910 indicates that for each fashion item, a count is obtained of the number of ensembles that also include another fashion item that meets the fashion item criteria.

Process block 912 indicates that a degree of correlation (e.g., a percentage) is calculated for each of a pair of fashion items indicating the percentage of ensembles that include both fashion items of the pair. With reference to bi-directional branch 804 between node 802-1 and node 802-3, for example, count indicators 806 indicate that node 802-1 and node 802-3 correspond to 5 and 2 ensembles, respectively, that include the specified fashion items. With an underlying count of 1 ensemble that includes both specified fashion items, the percentage of ensembles with the fashion items of node 802-1 (i.e, Chanel bags) that also include the fashion items of node 802-1 (i.e, Prada sunglasses) is 20%, and the percentage of ensembles with the fashion items of node 802-1 (i.e, Prada sunglasses) that also include the fashion items of node 802-1 (i.e, Chanel bags) is 50%. Restated, 20% of the ensembles that include a Chanel bag also include Prada sunglass (1 of 5), while 50% of the ensembles that include Prada sunglasses also include a Chanel bag (i.e., 1 of 2).

Process block 914 indicates a social fashion graph is generated and displayed to indicate the fashion items and correlations between them.

Figure 10:
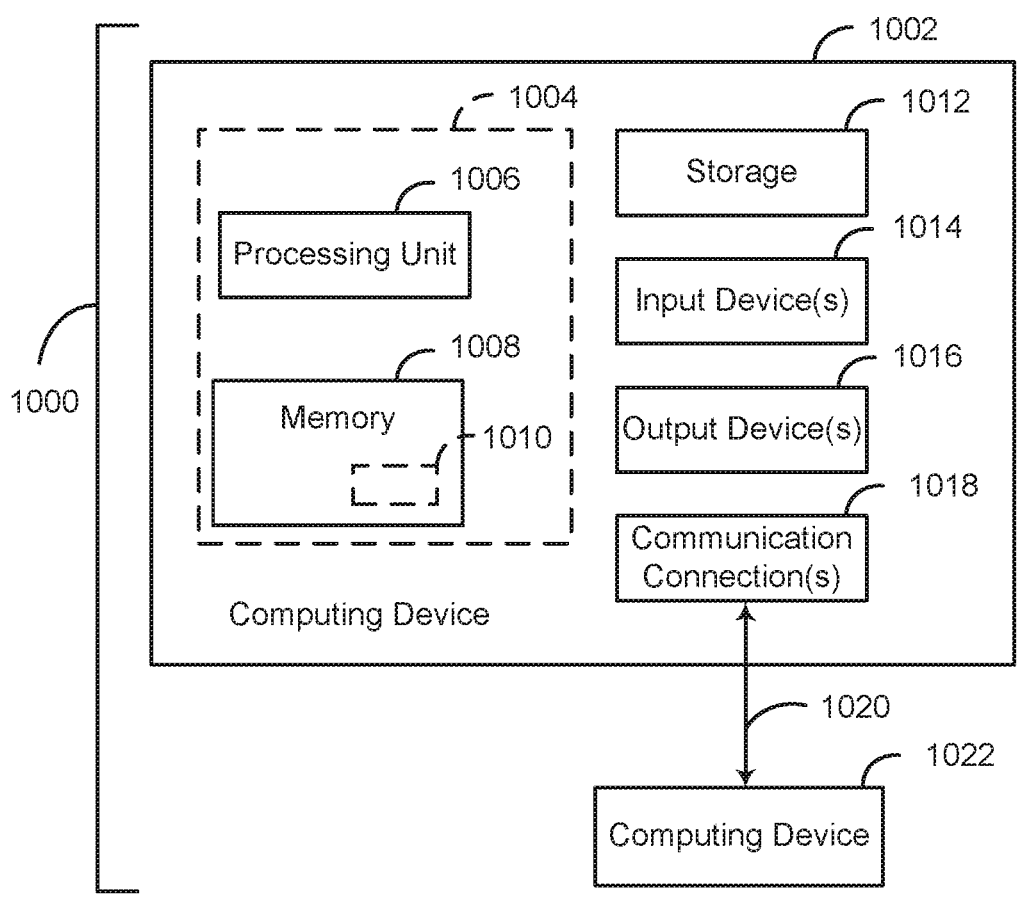
FIG. 10 is a block diagram of a system 1000 having a computing device 1002 as an operating environment of one or more embodiments described above.

FIG. 10 is a block diagram of a system 1000 having a computing device 1002 as an operating environment of one or more embodiments described above. Computing device 1002 includes a basic computing structure 1004 having a processing unit 1006 and a memory 1008. Processing unit 1006 executes or performs software or other computer-executed instructions 1010 stored in memory 1008 in accordance with operations described above. Processing unit 1006 may include one or more of any of a central processing unit, a co-processor, and a dedicated or special-purpose processing unit (e.g., an audio processor). Memory 1008 may include one or both of volatile memory (e.g., registers, cache, RAM) and non-volatile memory (e.g., ROM, EEPROM, flash memory), and may include one or more portions that are integrated with processing unit 1006 or distinct from it. Memory 1008 stores software or other computer-executed instructions 1010 that are executed or executable by processing unit 1006 and may also store other data or information.

Computing device 1002 may also include any or all of the following additional components: storage 1012, one or more input devices 1014, one or more output devices 1016, and one or more communication connections 1018. An interconnection mechanism (not shown), such as a bus, controller, or network, interconnects the components of computing device 1002. Typically, operating system software (not shown) provides an operating environment for software executed or performed by computing device 1002 on and coordinates operation of its components.

Storage 1012 may include portions that removable or non-removable and may include magnetic storage, optical storage, or electrical storage that may be local to or remote from basic computing structure 1004. In one embodiment, software 1010 and the operating system software may be stored in both memory 1008 and storage 1012, with software 1010 and the operating system software being loaded in memory 1008 from storage 1012 for execution by processing unit 1004.

To the extent used herein, the terms "computer readable medium" and "computer readable media" generally refer to any and all forms of memory 1008 and storage 1012 and may be volatile or nonvolatile, removable or non-removable, and by way of example and not limitation may include any or all of the following types: RAM, ROM, EEPROM, flash memory, or other memory circuit technologies, CD-ROM, Digital Versatile Disks (DVDs) or other optical storage, magnetic storage devices such as disks, tapes, cassettes, etc.

Input device or devices 1014 may include one or more of: keyboard, keypad, touchscreen, touchpad, mouse, trackball, pen, voice input device, camera, scanner, or any other input device. Output device(s) 1016 may include one or more of: display, speaker, printer, motion or action actuator or activator, transmitter, or any other output device. Each input device 1014 and output device 1016 may be connected to or communicate with computing device 1002 via any wired or wireless connection employing any optical, electrical, electromagnetic, or acoustic communication.

Computing device 1002 communicates through communication connection or connections 1018 over a communication medium 1020 with one or more other computing devices 1022. Communication medium 1020 carries information, such as data, computer-executable instructions, audio or video information, or other information, between computing devices 1002 and 1022. By way of example, communication medium 1020 may include direct or networked communication between computing devices 1002 and 1022 and may include one or more of wired or wireless connections employing electrical, optical, electromagnetic, acoustic, or other carriers. As one example, communication medium 1020 may include a global computer network such as the Internet.

A person of ordinary skill in the art will recognize that they may make many changes to the details of the above-described exemplary systems and methods without departing from the underlying principles. Only the following claims, therefore, define the scope of the exemplary systems and methods.

The invention claimed is:

1. An online fashion community system, comprising:
   a processor;
   a fashion community database having stored therein access to plural fashion images received from plural users over a worldwide computer network, each fashion image including a respective user modeling plural fashion items together as an ensemble, the fashion community database further including a link to a vendor of each fashion item and fashion data regarding each fashion item, wherein at least some of the fashion items in the ensembles have a shared fashion datum;
   the fashion community database further storing user profiles of community users wherein at least some of the user profiles include identifiers of fashion images and related information associated with the corresponding user; and a computer network site that provides to a community of users over the worldwide computer network plural ones of the fashion images in which fashion items have the shared fashion datum, together with access to the fashion data for the fashion items in each of the plural ones of the fashion images and information linking to vendors of the fashion items;

the computer network site including a fashion community search interface arranged to receive search criteria input by a community user over a public computer network to select a fashion item;

the online fashion community system configured to search the fashion community database to identify stored fashion images that include a first fashion item that meets the search criteria among the fashion items worn together in the corresponding ensemble;

accessing the stored user profile of the community user that input the search criteria;

comparing the identified fashion images to the user profile to select from among the identified fashion images at least one of the identified fashion images that was previously associated to the community user in their stored user profile;

returning at least one of the selected fashion images over the public computer network to the fashion community interface; and returning the stored fashion information to the fashion community interface for at least some of the fashion items that appear in the returned fashion images.

2. The system of claim 1 in which the shared fashion datum includes a clothing category, color, or brand.

3. The system of claim 1 in which the fashion community database further includes indications of affirmation ("like") of selected fashion images received from community users over the worldwide computer network and the computer network site further includes indications of affirmation provided with the selected fashion images over the worldwide computer network to the community of users.

4. The system of claim 1 wherein the fashion image is associated to the community user because the user previously uploaded the image, "liked" the image, commented on the image, or purchased a fashion item represented in the image.

5. A method comprising:
provisioning a fashion community database that stores user profiles and fashion images posted by community members or users, wherein each fashion image shows a person wearing two or more fashion items together, the two or more fashion items shown worn together defining an ensemble corresponding to the fashion image;

the fashion community database further storing fashion information for each of at least some of the fashion items that are shown in the fashion images;

wherein the stored fashion information for a fashion item includes a link to a retail service from which to purchase the fashion item;

further wherein at least some of the user profiles include identifiers of fashion images and related information associated with the corresponding user;

receiving search criteria input to a fashion community interface by a community user over a public computer network;

searching the fashion community database to identify stored fashion images that include a first fashion item that meets the search criteria among the fashion items worn together in the corresponding ensemble;

accessing the stored user profile of the community user that input the search criteria;

comparing the identified fashion images to the stored user profile to select from among the identified fashion images at least one of the identified fashion images based on the stored user profile;

returning at least one of the selected fashion images over the public computer network to the fashion community interface; and returning the stored fashion information for at least some of the fashion items that appear in the selected fashion images to the fashion community interface.

6. The method of claim 5 wherein the returned fashion information includes links or tags in the returned fashion images to access corresponding fashion item provider information.

7. The method of claim 5 wherein the selecting step includes comparing the identified fashion images to the user profile of the user that input the search criteria to return fashion images previously associated with the user.

8. The method of claim 7 wherein a fashion image is associated with the user because the user previously uploaded the image, commented on the image, or took another action associated with the image in the fashion community interface.

9. The method of claim 5 wherein the selecting step includes comparing the fashion items worn together in the identified fashion images to the user profile of the user that input the search criteria to return fashion images (ensembles) that include fashion items previously associated with the user.

10. The method of claim 9 wherein a fashion item is associated with the user because the user previously uploaded a fashion image that includes the fashion item.

11. The method of claim 9 wherein a fashion item is associated with the user because the user previously searched or browsed the fashion community database based on metadata that matches metadata of the fashion item.

12. The method of claim 11 wherein the metadata of the fashion item includes at least one of type of clothing or accessory, color, and brand.

13. The method of claim 5 wherein the search criteria include one or more information fields including fields relating to types, colors, or brands of fashion items.

14. The method of claim 5 wherein the search criteria include one or more information fields including fields relating to users who have posted ensembles, the locations of posting users, ensembles that have been affirmed or "liked" by the user, and dates ensembles were posted.

15. The method of claim 5 wherein the selecting step includes comparing a geographic location of a user that posted the fashion image to the geographic location of the community user that input the search criteria.

\* \* \* \* \*